US010726490B1

(12) United States Patent
Broussard et al.

(10) Patent No.: US 10,726,490 B1
(45) Date of Patent: Jul. 28, 2020

(54) PHOTOGRAPH LABEL CLAIMS TOOL

(71) Applicant: Allstate Insurance Company, Northbrook, IL (US)

(72) Inventors: Ryan Broussard, Woodstock, IL (US); Danny Joe Clark, Jr., Denison, TX (US); Jeffrey Fetting, Lake in the Hills, IL (US); Christopher Rose, Miami, FL (US)

(73) Assignee: Allstate Insurance Company, Northbrook, IL (US)

( * ) Notice: Subject to any disclaimer, the term of this patent is extended or adjusted under 35 U.S.C. 154(b) by 208 days.

(21) Appl. No.: 15/066,769

(22) Filed: Mar. 10, 2016

(51) Int. Cl.
| | |
|---|---|
| G06Q 40/08 | (2012.01) |
| G06F 3/0484 | (2013.01) |
| G06F 3/0482 | (2013.01) |
| G06T 3/60 | (2006.01) |
| G06T 3/40 | (2006.01) |
| G06F 40/166 | (2020.01) |

(52) U.S. Cl.
CPC .......... *G06Q 40/08* (2013.01); *G06F 3/0482* (2013.01); *G06F 3/04842* (2013.01); *G06F 3/04845* (2013.01); *G06F 40/166* (2020.01); *G06T 3/40* (2013.01); *G06T 3/60* (2013.01)

(58) Field of Classification Search
CPC ....... G06Q 40/08; G06F 3/0482; G06F 17/24; G06F 3/04842; G06F 3/04845; G06F 40/166; H04N 1/00307; G06T 7/0044; G06T 3/60; G06T 3/40
See application file for complete search history.

(56) References Cited

U.S. PATENT DOCUMENTS

| | | | | |
|---|---|---|---|---|
| 6,999,111 | B2 * | 2/2006 | McIntyre | H04N 1/00307 |
| | | | | 348/207.1 |
| 9,836,793 | B2 * | 12/2017 | Busque | G06Q 40/08 |
| 2003/0028404 | A1 * | 2/2003 | Herron | G06Q 40/02 |
| | | | | 705/4 |
| 2006/0133670 | A1 * | 6/2006 | Barrus | G06F 17/243 |
| | | | | 382/173 |
| 2006/0174206 | A1 * | 8/2006 | Jung | H04N 1/00132 |
| | | | | 715/751 |
| 2008/0148176 | A1 * | 6/2008 | Mita | G06F 3/04815 |
| | | | | 715/781 |
| 2013/0125039 | A1 * | 5/2013 | Murata | G06F 3/0484 |
| | | | | 715/781 |
| 2013/0317861 | A1 * | 11/2013 | Tofte | G06Q 40/08 |
| | | | | 705/4 |
| 2014/0067433 | A1 * | 3/2014 | Hargrove | G06Q 10/10 |
| | | | | 705/4 |

* cited by examiner

*Primary Examiner* — Andrew L Tank
(74) *Attorney, Agent, or Firm* — Banner & Witcoff, Ltd.

(57) ABSTRACT

Systems, apparatuses, methods discussed herein provide insurance claims adjusters with the ability to quickly label numerous photographs associated with an insurance claim. For instance, a photograph label claims tool may be installed on a computing device of the insurance claims adjuster. The photograph label claims tool may facilitate labeling and formatting of photographs taken by the insurance claims adjuster of damaged property items, which may be used to settle an insurance claim. The photograph label claims tool may then generate a document (e.g., a PDF) including each of the labeled photographs and transmit the document to an insurance provider.

17 Claims, 9 Drawing Sheets

Export

Export Type: ◯ Compressed Images  ● PDF

Export Items: ◯ Selected Photographs

● Photographs By Claim Number

0123456789

Batch Mode: ● Off  ◯ On ( Export )  ( Cancel )

FIG. 6

Email Preferences

Automatic Upon Export to PDF

- ● Automatically generate email
- ● Automatically send email

Default Settings

Recipient(s): abc@abc.com

Subject: Labeled Photos for Claim No.: 0123456789

Body: This email was automatically generated using photo label claims tool.

Apply   Cancel

FIG. 7

Photo Labels
Claim No. XXXXXXXX

House: Water Damage

Insurance Company;
Claim No. 0123456789

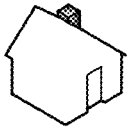

Roof: Hail Damage

Insurance Company;
Claim No. 0123456789

Door: Wind Damage

Insurance Company;
Claim No. 0123456789

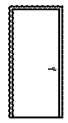

Garage (attached): Debris Damage

Insurance Company;
Claim No. 0123456789

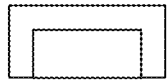

Date: 7/1/2015 11:37:37 AM
This document contains confidential information that is proprietary to the insurance company. Neither the document nor the information contained therein should be disclosed or reproduced in whole or in part, without express consent of the insurance company.

FIG. 8

PHOTOGRAPH LABEL CLAIMS TOOL

TECHNICAL FIELD

Aspects of the disclosure generally relate to computer systems and computer software. For instance, aspects of this disclosure provide insurance claims adjusters with the ability to quickly format and label numerous photographs and associate such photographs with a claim.

BACKGROUND

Insurance claims adjusters investigate claims, in part, by inspecting property damage to determine how much property damage occurred and to what extent such property damage is covered by an individual's insurance policy. When insurance claims adjusters inspect property damage, they take photographs of the property damage as evidence of the property damage for later analysis by the insurance claims adjuster or one or more insurance providers.

Recently, the number of photographs pertinent to settle a claim for property damage has increased dramatically. For example, the number of pertinent photographs of property damage for a home has risen from 5-8 photographs to over 100 photographs. As a result, insurance claims adjusters are spending a greater amount of time analyzing photographs for the insurance provider.

Accordingly, new systems, devices, methodologies, and software are desired to alleviate the temporal burdens placed on the insurance claims adjusters in adequately analyzing the photographs. That is, there is an ever-present need to reduce the amount of time insurance claims adjusters take in analyzing the photographs of property damage for submission to an insurance provider.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure address one or more issues discussed above by disclosing methods, computer readable media, software systems, and apparatuses for providing insurance claims adjusters with the ability to quickly format and label numerous photographs and associate such photographs with a claim. For instance, a photograph label claims tool may be downloaded and installed on one or more computing devices used by an insurance claims adjuster after appropriate authentication of the insurance claims adjuster and/or the one or more computing devices. The insurance claims adjuster may take numerous photographs of property damage as evidence of a claim. The photographs may be imported into the photograph label claims tool. A claim number may be entered into the photograph label claims tool, which may then be locally validated or remotely validated with an insurance provider. The photograph label claims tool may prevent manipulation of the imported photographs until a valid claim number is submitted. Once a valid claim number is submitted, the photograph label claims tool may associate each of the imported photographs with the claim number.

Using the photograph label claims tool, the insurance claims adjuster may select, for each photograph, one or more preset labels for the photograph. Each of the present labels may be different options for describing a photograph in relation to an insurance claim. Some preset labels may include a location or a description of the property item depicted in the photograph while other preset labels may describe types of property damage. In some cases, the insurance claims adjuster may enter customized labels by manually entering a custom label or by previously setting a customized label for selection with one or more of the imported photographs. For instance, if the insurance claims adjuster works in a market or location where a particular property item is frequently damaged (e.g., pool pumps in Florida), the insurance claims adjuster may create a customized label for pools for use with subsequent claims. Once one or more labels have been selected for the imported photographs, the photograph label claims tool may automatically adjust the size of the imported photographs. For instance, the size of the photographs may be reduced in order to compress the photographs to lower the file size for transfer to the insurance provider. Additionally, in order to further reduce the file size of the imported photographs, the resolution of the photographs may be reduced. The insurance claims adjuster may select various output options for sending the photographs to the insurance provider. One output option may include generating a file in portable document format (PDF) that includes a copy of each of the adjusted imported photographs with each photograph having the labels selected by the insurance claims adjuster.

In some embodiments, an apparatus may include a processor and a memory storing computer-executable instructions that, when executed by the processor, cause the apparatus to perform one or more of the following steps. The apparatus may associate a photograph with a claim number for an insurance claim and display a user interface. The user interface may include the photograph, a set of preset labels describing property items, and a set of preset labels describing types of damage. The apparatus may receive a selection of a preset label to describe a property item depicted in the photograph. The apparatus may receive a selection of a preset label to describe a type of damage associated with the property item depicted in the photograph. The apparatus may reduce a resolution and size of the photograph. The apparatus may generate a document that includes the claim number, the photograph having the reduced size and the reduce resolution, the selected preset label describing the property item depicted in the photograph, and the selected preset label describing the type of damage associated with the property item depicted in the photograph. The apparatus may transmit the document to the insurance provider.

In some embodiments, a computing device may perform a method. For instance, the computing device may receive photographs and associate the photographs with a claim number for an insurance claim. The computing device may display a user interface that includes the photographs, a set of preset labels describing property items, and a set of preset labels describing types of damage. The computing device may receive a selection of a preset label to describe a property item depicted in the first photograph. The computing device may receive a custom label describing a type of damage associated with the property item depicted in a second photograph. The computing device may save the custom label as a preset label for use with labeling photographs associated with a different claim number.

In some embodiments, a system may include a computing device of an insurance claims adjuster. The computing device may include a processor and a memory unit storing computer-executable instructions that, when executed by the processor, cause the system to perform one or more steps. For instance, the system may associate a photograph with a claim number for an insurance claim. The system may display a user interface that includes the photograph, a set of preset labels describing property items, and a set of labels describing types of damage. The system may receive a selection of a preset label to describe a property item depicted in the photograph. The system may receive a selection of a preset label to describe a type of damage associated with the property item depicted in the photograph. The system may reduce a resolution and a size of the photograph. The system may generate a document that includes the photograph, the selected preset label describing the property item depicted in the photograph, and the selected preset label describing the type of damage associated with the property item depicted in the photograph. The system may transmit the document to an insurance provider.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 depicts options for exporting photographs, according to one or more aspects of the disclosure.

FIG. 7 depicts email preferences for sending an email of the photographs, according to one or more aspects of the disclosure.

FIG. 8 depicts an output of formatted and labeled photographs, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Systems, apparatuses, methods discussed herein reduce the burden on the insurance claims adjuster to quickly and efficiently format and label photographs of property damage taken by the insurance claims adjuster. By using a photograph label claims tool, the insurance claims adjuster may label and format numerous photographs in a relatively short period of time. The photograph label claims tool may automatically correct the orientation of the photographs, adjust the size of the photographs, and adjust the quality (e.g., resolution) of the photographs. The photograph label claims tool may then append labels selected by the insurance claims adjuster to the photographs and send the photographs to an insurance provider for further analysis.

As will be appreciated by one of skill in the art upon reading the disclosure herein, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
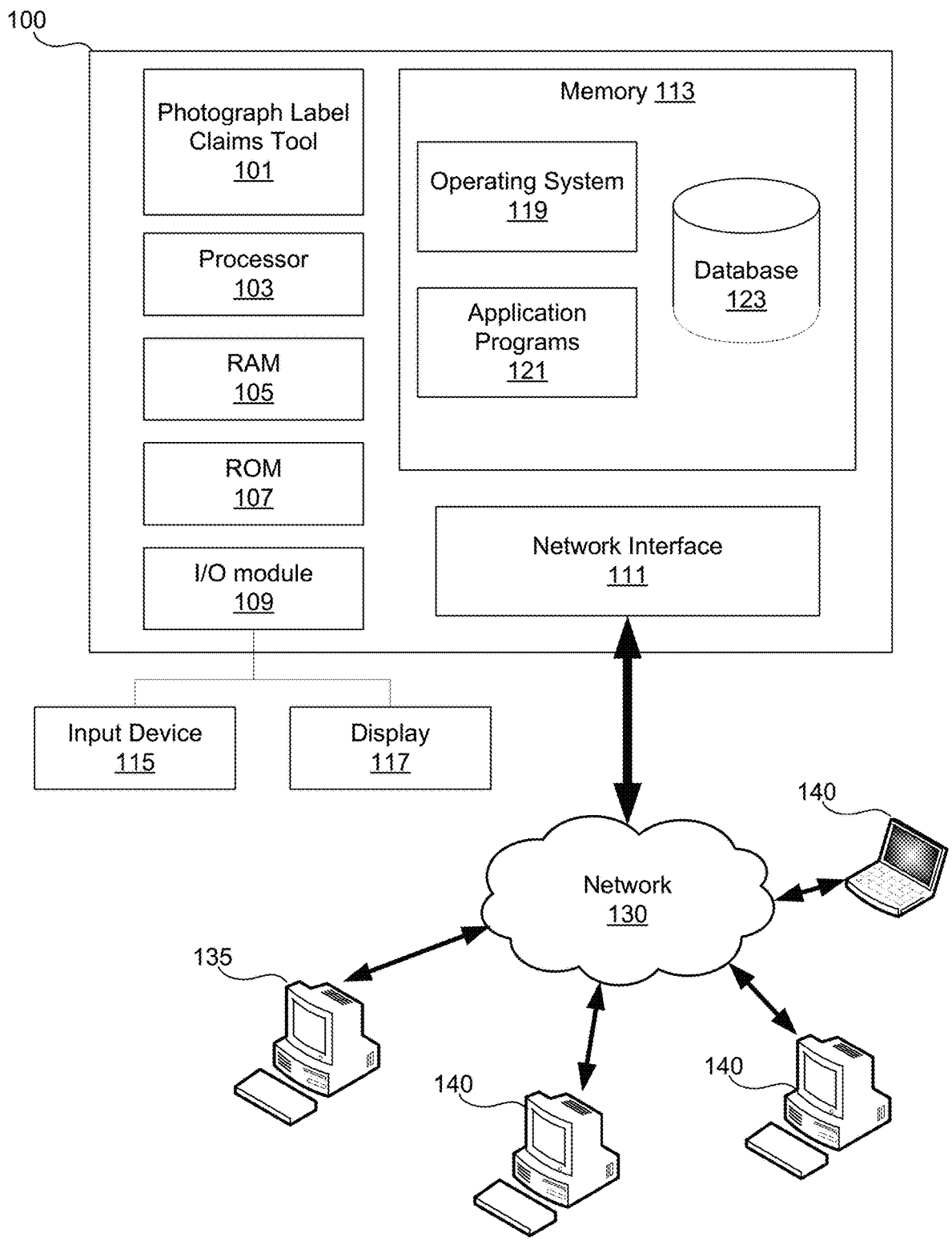
FIG. 1 depicts an illustrative computing system including an illustrative block diagram of an example computing device, according to one or more aspect of the disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be a personal computer (e.g., a desktop computer), server, laptop computer, notebook, tablet, smartphone, etc. configured to perform particular functions, as will be discussed more fully herein. The computing device 100 may include a photograph label claims tool 101 for performing methods described herein. The photograph label claims tool 101 may be implemented with a processor and memory. Throughout this disclosure, photograph label claims tool 101 may be used to reference a combination of the processor and memory storing instructions executed by that processor and/or the instructions themselves. The processor of photograph label claims tool 101 may operate in addition to or in conjunction with another processor 103 of the computing device 100. Both photograph label claims tool 101 and processor 103 may be capable of controlling operations of computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, insurance claims adjusters may interact with the photograph label claims tool 101. For instance, the insurance claims adjuster may select photographs and one or more preset labels to describe the selected photographs, which will be described in further detail below. For instance, the insurance claims adjuster may configure various settings of photograph label claims tools 101, such as adding customized preset labels, described in further detail below.

Memory 113 may be any computer readable medium for storing computer executable instructions (e.g., software). The instructions stored within memory 113 may enable the computing device 100 to perform various functions when executed by processor 103. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more management servers 135 for the photograph label claims tool 101 and one or more other computing devices 140, such as laptops, notebooks, smartphones, personal computers, servers, etc.

The management servers 135 may also include similar components as computing device 100, which may be configured in the same or similar manner as computing device 100. Management servers 135 may be responsible for managing the photograph label claims tool 101 installed on various computing devices 100 of insurance claims adjusters. For instance, the management servers 135 may, after appropriate authentication of an insurance claims adjusters and/or their computing devices 100, permit download of the photograph label claims tool 101 for use by the insurance claims adjusters. Administrators may manage and/or update the photograph labels claims tools 101 installed on the computing devices 100 through the management servers 135. The management servers 135 may provide updates for the photograph label claims tool 101 to the computing devices 100 via network 130.

Computing devices 140 may also include similar components as computing device 100, which may be configured in the same or similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
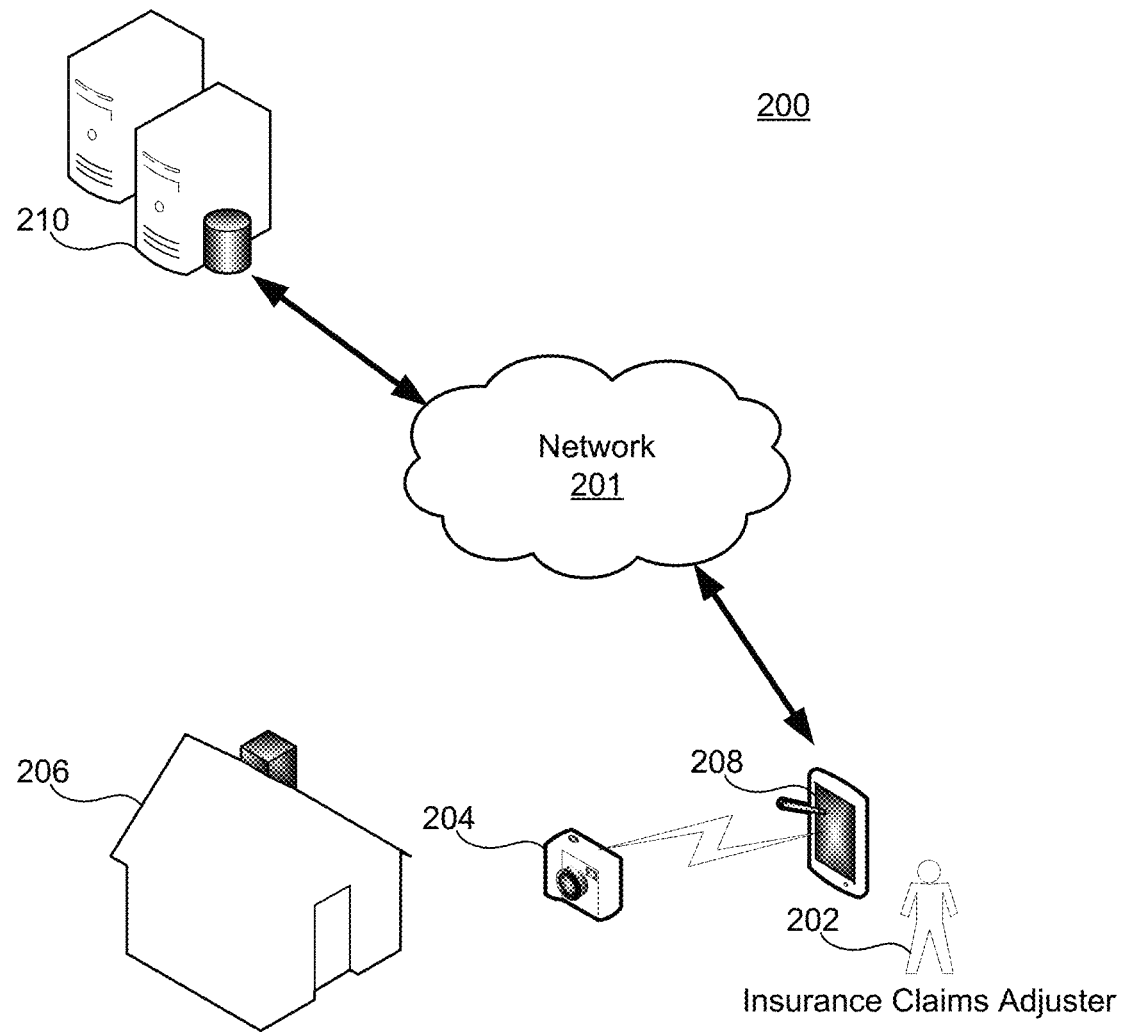
FIG. 2 depicts an illustrative system, according to one or more aspect of the disclosure.

FIG. 2 illustrates an example network environment 200 for implementing methods according to the present disclosure. As shown in FIG. 2, the network environment 200 may include multiple different systems 208 and 210 communicatively interconnected by network 201, which may be a combination of wired and/or wireless networks. Network 201 may be any type of network (e.g., network 130 described above). In particular, network 201 may include a cellular network and its components, such as base stations, cell towers, antennas, satellites, routers for connecting one device to another.

Each system 208-210 may include one or more computing devices (e.g., servers, thin clients, computers, laptops, tablets, etc.), each of which may include the components and functionalities of computing device 100 discussed above. Additionally, each system 208-210 may include one or more databases for storing and retrieving information.

In some cases, system 210 (e.g., management server 135) may be an insurance provider responsible for providing insurance to individuals and/or entities in exchange for an insurance premium. Such insurance policies may include coverage for damages that occur to the policy holder's physical property in the event of accident or act of nature. The specific scenarios covered and/or not covered by the insurance policies may be expressly laid out in the insurance policies. After an accident, the insurance company may receive a claim (e.g., a request for payment by the insurance provider to the insured) based on the terms of a particular insurance policy. If the claim is covered by one or more policies of the insured individual, an appropriate amount of money is paid out on behalf of the insured.

In order to aid with the determination of whether the insured is covered under his or her insurance policy, how much property damage occurred, and how much to pay out, the insurance company may employ insurance claims adjusters 202. Insurance claims adjusters 202 investigate claims, determine the insurance provider's liability (e.g., the amount of coverage provided under an insurance policy for covered damages to, for example, physical property), settle claims, and the like. Insurance claims adjusters 202 investigate claims, in part, by inspecting property damage to determine how much property damage occurred and to what extent such property damage is covered by an individual's insurance policy. When insurance claims adjusters 202 inspect property damage, they take numerous photographs of the property item 206 that has been damaged using a camera 204 which may be a separate device or may be incorporated into one or more computing devices.

The management server 135 of the insurance provider may, using a photograph label claims tool manager, be configured to generate, edit, manage, and deliver a photograph label claims tool 101 (e.g., a mobile application or other software application). The photograph label claims tool 101 may be downloaded, installed, and executed on one or more client-side computing devices such as system 208 (also referred to herein as adjuster's computing device 208), which may be a smartphone, a cellular-enabled tablet, a laptop, a personal computer, or other computing device. In some instances, computing device 208 and camera 204 may be a single device. In other instances, computing device 208 may be separate from camera 204 and may wirelessly communicate with camera 204 over one or more channels. In such instances, the photographs taken using camera 204 may be transmitted to computing device 208. Additionally or alternatively, in some instances, the camera 204 may include a removable storage device (e.g., a USB-flash drive, memory card, etc.), which may be used to store the photographs when attached to camera 204. The removable storage device may be decoupled from camera 204 and coupled to the computing device 208 so that computing device 208 may obtain the photographs stored on the removable storage device.

In one or more arrangements, the photographs may be imported into the photograph label claims tool 101. A claim number may be entered into the photograph label claims tool 101, which may then be locally validated or remotely validated with an insurance provider. The photograph label claims tool 101 may prevent manipulation of the imported photographs until a valid claim number is submitted. For instance, photograph label claims tool 101 may block user input to functions associated with the photographs. Once a valid claim number is submitted, the photograph label claims tool 101 may associate each of the imported photographs with the claim number. Using the photograph label claims tool 101, the insurance claims adjuster 202 may select, for each photograph, one or more preset labels for photographs. Each of the present labels may be different options for describing a photograph in relation to an insurance claim. Some preset labels may include a location or description of the property item 206 while other preset labels may describe types of property damage. In some cases, the insurance claims adjuster 202 may enter customized labels by manually entering the label or by setting a customized label for selection with one or more of the imported photographs. For instance, if the insurance claims adjuster 202 works in a market or location where a particular property item is frequently damaged (e.g., pool pumps in Florida), the insurance claims adjuster may create customized label for use with other claims. Once one or more labels have been selected for the imported photographs, the photograph label claims tool 101 may automatically adjust the size of the imported photographs. For instance, the size of the photographs may be reduced in order to compress the photographs to lower the file size for transfer to the insurance provider. Additionally, in order to further reduce the file size of the imported photographs, the resolution of the photographs may be reduced. The insurance claims adjuster 202 may select various output options for sending the photographs to the insurance provider. One output option may include generating a PDF that includes a copy of each of the adjusted imported photographs with each photograph having the labels selected by the insurance claims adjuster 202.

Figure 3:
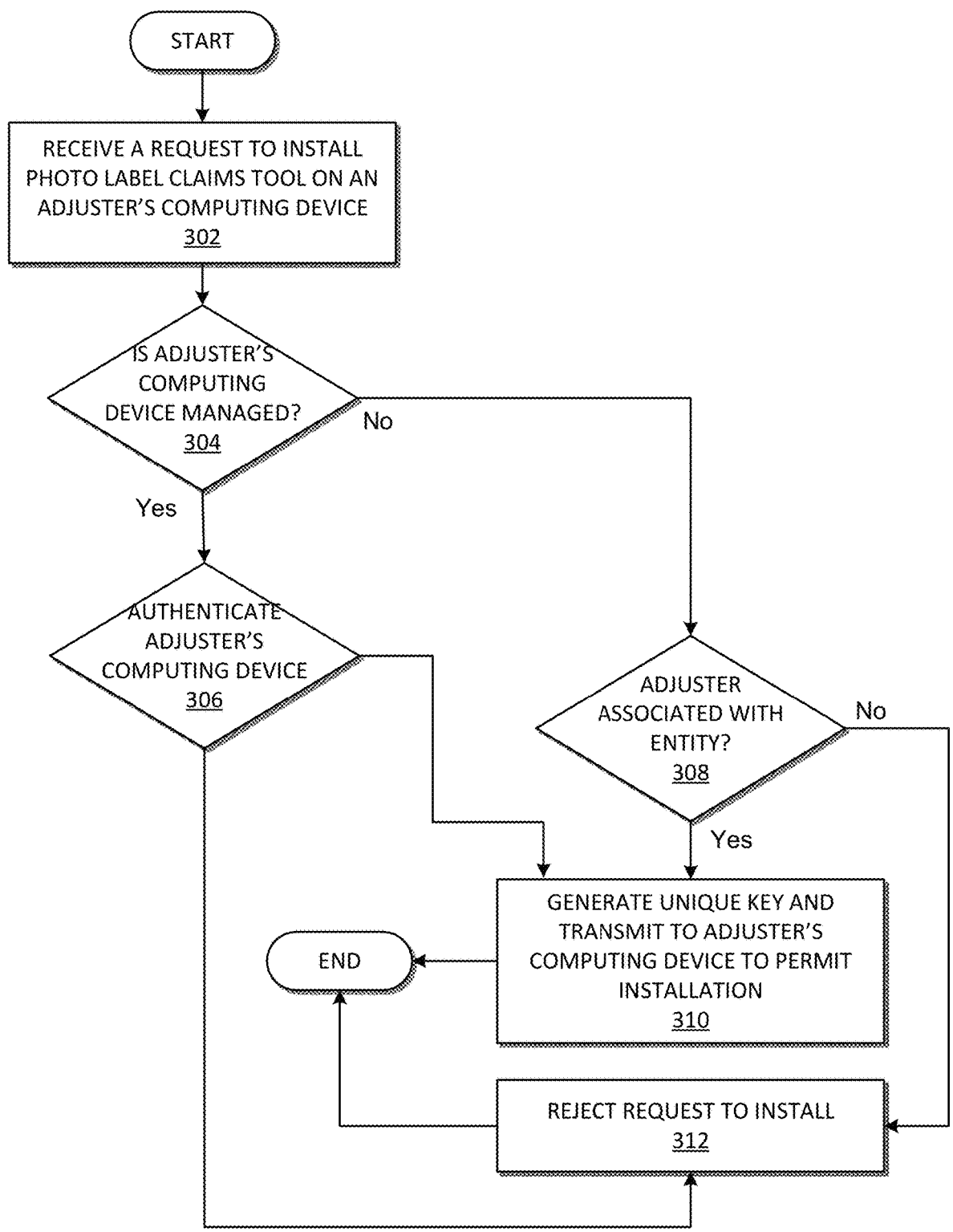
FIG. 3 depicts an illustrative method for installing a photograph label claims tool, according to one or more aspect of the disclosure.

FIG. 3 depicts an illustrative method for installing a photograph label claims tool 101 on an adjuster's computing device 208 for use by the insurance claims adjuster 202, according to one or more aspect of the disclosure. The method of FIG. 3 and/or one or more steps thereof may be performed by a computing device (e.g., a management server 135 of an insurance provider). The method illustrated in FIG. 3 and/or one or more steps thereof may be partially or fully embodied, for example, in computer-executable instructions that are stored in a computer-readable medium, such as a non-transitory computer-readable memory. In some instances, one or more steps of FIG. 3 may be performed in a different order and/or combined. In some instances, one or more steps of FIG. 3 may be omitted and/or otherwise not performed.

As shown in FIG. 3, the method may begin at step 302 in which an insurance provider's management server 135 (e.g., a computer, a thin-client, a workstation, etc.) may receive a request to install the photograph label claims tool 101 on the adjuster's computing device 208 of the insurance claims adjuster 202. The request may be received from the adjuster's computing device 208 and may include an identifier of the insurance claims adjuster 202 (e.g., legal name, claims adjuster ID, employee ID, work email address, or the like), an identifier of the adjuster's computing device 208 (e.g., a media access control (MAC) address, etc.), and/or other information of the insurance claims adjuster 202. In some instances, the management server 135 of the insurance provider may specify what information should be included in the request via, e.g., a web-based portal.

At step 304, the management server 135 may determine whether the adjuster's computing device 208 is managed by the insurance provider. For instance, the insurance provider may maintain a database or library of identifiers (e.g., MAC addresses, network addresses, etc.) of adjuster computing devices that are managed by the insurance provider for use in a device management environment. The database or library may be part of the management server 135 or communicatively coupled to the management server 135. The management server 135 may compare the identifier of the adjuster's computing device 208 received in the request with the identifiers of managed computing devices listed in the database. If the identifier of the adjuster's computing device 208 matches one of the ones listed in the database, then the adjuster's computing device 208 may be identified as being managed by the insurance provider. Otherwise, if the identifier of the adjuster's computing device 208 does not match any of the ones listed in the database, then the adjuster's computing device 208 may be identified as not being managed by the insurance provider. If the adjuster's computing device 208 is managed by the insurance provider, the method may proceed to step 306. Otherwise, if the adjuster's computing device is not managed by the insurance provider, the method may proceed to step 308.

At step 306, the management server 135 may authenticate the adjuster's computing device 208 using one or more authentication mechanisms. In some instances, a public key infrastructure (PKI) may be employed, which may include a certificate authority, a validation authority, and/or a registration authority and use a combination of private keys and public keys. If the adjuster's computing device 208 is authentic, the process may continue to step 310. In some cases, the management server 135 may setup a secure session with the adjuster's computing device 208 in order to enable the management server 135 and the adjuster's computing device 208 to securely transmit messages to one another. Otherwise, if the adjuster's computing device is not authentic, the management server 135 may proceed to step 312. At step 312, the management server 135 may send a rejection message to the adjuster's computing device 208 rejecting the request to install the photograph label claims tool 101 and indicating that the adjuster's computing device could not by authenticated or that a secure session was unable to be set up, and the process may end.

At step 308, the management server 135 may determine whether the insurance claims adjuster 202 is associated with a particular entity. The entity may be the insurance provider associated with the management server 135, a third-party contractor used by the insurance provider, or another entity associated with insurance provider. In many examples, the insurance provider may wish to verify that the insurance claims adjuster 202 is an employee and/or otherwise associated with the insurance provider prior to providing the insurance claims adjuster 202 with the photograph label claims tool 101.

The determination of whether the insurance claims adjuster 202 is associated with an entity may include one or more verification mechanisms. For instance, the insurance provider may verify one or more identifiers specific and/or otherwise unique to the insurance claims adjuster 202. The identifier may be the insurance adjuster's 202 employee ID number, work email address, social security number, legal name, employee username and password, or combination thereof. In some cases, the management server 135 may compare the received identifier(s) of the insurance claims adjuster 202 with identifiers of insurance claims adjusters stored in a database and associated with the entity. If at least some minimum preset threshold of identifiers received in the request match those in the database, the insurance claims adjuster 202 may be identified as being associated with the entity. Otherwise, the insurance claims adjuster may be identified as not being associated with the entity and proceed to step 312.

In some cases, the request may be missing identifiers of the insurance claims adjuster 202. In such cases, the management server 135 may identify the missing types of identifiers (e.g., legal name, work email address, employee ID, etc.) and may transmit a message to the adjuster's computing device 208 requesting such information. If a response is not received the within a specified time period (e.g., a time out period), the process may proceed to step 312.

In some instances, rather than using a list of valid work email addresses for its employees and/or associated persons, the insurance provider may simply inspect the domain of the email address. For example, a work email address for an insurance claims adjuster 202 may be abcdef@123456.com. The "123456.com" may be the domain and correspond to an IP address or host name for the insurance provider. In order for the domain address of the adjuster's work email address to be valid, it may have to match the domain address specified by the insurance company. If there is a match, the insurance company may determine that the insurance claims adjuster 202 is associated with the insurance provider and the process may proceed to step 310. Otherwise, if there is not a match, the insurance company may determine that the insurance claims adjuster is not associated with the insurance provider and the process may proceed to step 312.

In one or more arrangements, the management server 135 may require that the identifiers of the insurance claims adjuster 202 be transmitted in a specified manner. In one illustrative use case, the identifier used to verify the insurance claims adjuster 202 may be the adjuster's work email address. In such a case, the management server 135 may insist that the request be received via email and from the adjuster's work email address. If the request is not received from the adjuster's work email address (e.g., the request is sent from another email address and identifies the adjuster's work email address), the method may proceed to step 312 where the request may be rejected. If the request is received from the adjuster's work email, the process may proceed to step 310. As discussed above, the management server 135 may compare the email address from which the email was transmitted with the list of work email address stored in a database to determine whether the email is a work email address.

In some cases, the identifier may be dynamically generated by the management server 135. For example, in response to receiving the request, the management server 135 may generate a temporary number using a random number generator and transmit this number to the work email address of the insurance claims adjuster 202. The insurance claims adjuster 202 may then access the adjuster's work email and provide the number to the management server 135. If the numbers match, the insurance claims adjuster 202 may be identified as associated with the entity. If the numbers do not match, a new number may be generated using the random number generator and sent to the work email address of the insurance claims provider 202. If the numbers continue not to match for a preset number of intervals (e.g., attempts), the process may proceed to step 312. As indicated above, a number generated by the random number generator may be temporary. As a result, the number may expire after a preset time period has elapsed. As a result, if a matching number is received after the time period has elapsed, the management server 135 may treat the match as not matching and generate a new number. In some cases, the number may be provided to the management server 135 from the insurance claims adjuster 202 via its web-portal.

At step 310, the management server 135 may generate a unique key and transmit the unique key to the adjuster's computing device 208 to permit installation of the photograph label claims tool 101. The management server 135 may also insert the unique key into the photograph label claims tool 101 and permit the adjuster's computing device 208 to download the photograph label claims tool 101. The adjuster's computing device 208 might not be able or permitted to access the unique key inserted into the photograph label claims tool 101. For instance, the inserted unique key may be obfuscated, hidden and/or otherwise inaccessible by the insurance claims adjuster 202.

The unique key may be transmitted to the adjuster's computing device 208 separately from the photograph label claims tool 101. In some cases, the unique key may be sent to the insurance claims adjuster's work email address. Once the photograph label claims tool 101 has been downloaded by the adjuster's computing device 208, it might not permit its installation and use until it receives the unique key from the insurance claims adjuster 202 via input device 115. As an example, during the installation of the photograph label claims tool 101, the adjuster's computing device 208 may prompt the insurance claims adjuster 202 to enter the unique key, which it may then compare with the unique key it was configured to accept (e.g., the unique key inserted into the photograph label claims tool 101). If the received unique key matches the unique key inserted into the photograph label claims tool 101, then the installation and use of the photographs label claims tool 101 may be performed. Otherwise, if the unique keys do not match, the photograph label claims tool 101 might block its installation and use. In some cases, the unique key may be temporary. For instance, the photograph label claims tool 101 may have to receive the unique key from the insurance claims adjuster 202 within a preset time period beginning from completion of the download of the photograph label claims tool 101. If it is not received, then the insurance claims adjuster 202 may have to re-authenticate the adjuster's device 208 and re-download the photograph label claims tool 101 that is now associated with a different unique key.

If the insurance claims adjuster 202 enters the wrong unique key, the photograph label claims tool 101 might not continue its installation and may re-prompt the insurance claims adjuster 202 to enter the unique key. If the insurance claims adjuster 202 enters the correct unique key, the photograph label claims tool 101 may continue and finish its installation of the photograph label claims tool 101. If the insurance claims adjuster 202 continues to enter the wrong unique key for a preset number of times, the photograph label claims tool 101 may request the insurance claims adjuster 202 to re-authenticate and re-download the photograph label claims tool 101 from the management server 101 having a different unique key.

By using a separately transmitted unique key to authorize the photograph label claims tool 101 to permit its installation and use, an unauthorized individual who has obtained the photograph label claims tool 101 cannot install or use the photograph label claims tool 101 since the unauthorized individual does not have the unique key.

At step 312, the management server 135 may reject the request to install the photograph label claims tool 101 at the adjuster's computing device 208. The rejection may be sent to the adjuster's computing device 208 for display to the insurance claims adjuster 202. The rejection may include one or more reasons the request was denied and/or one or more actions the insurance claims adjuster 202 can take (e.g., contact a representative of the insurance claims provider, etc.).

Figure 4A:
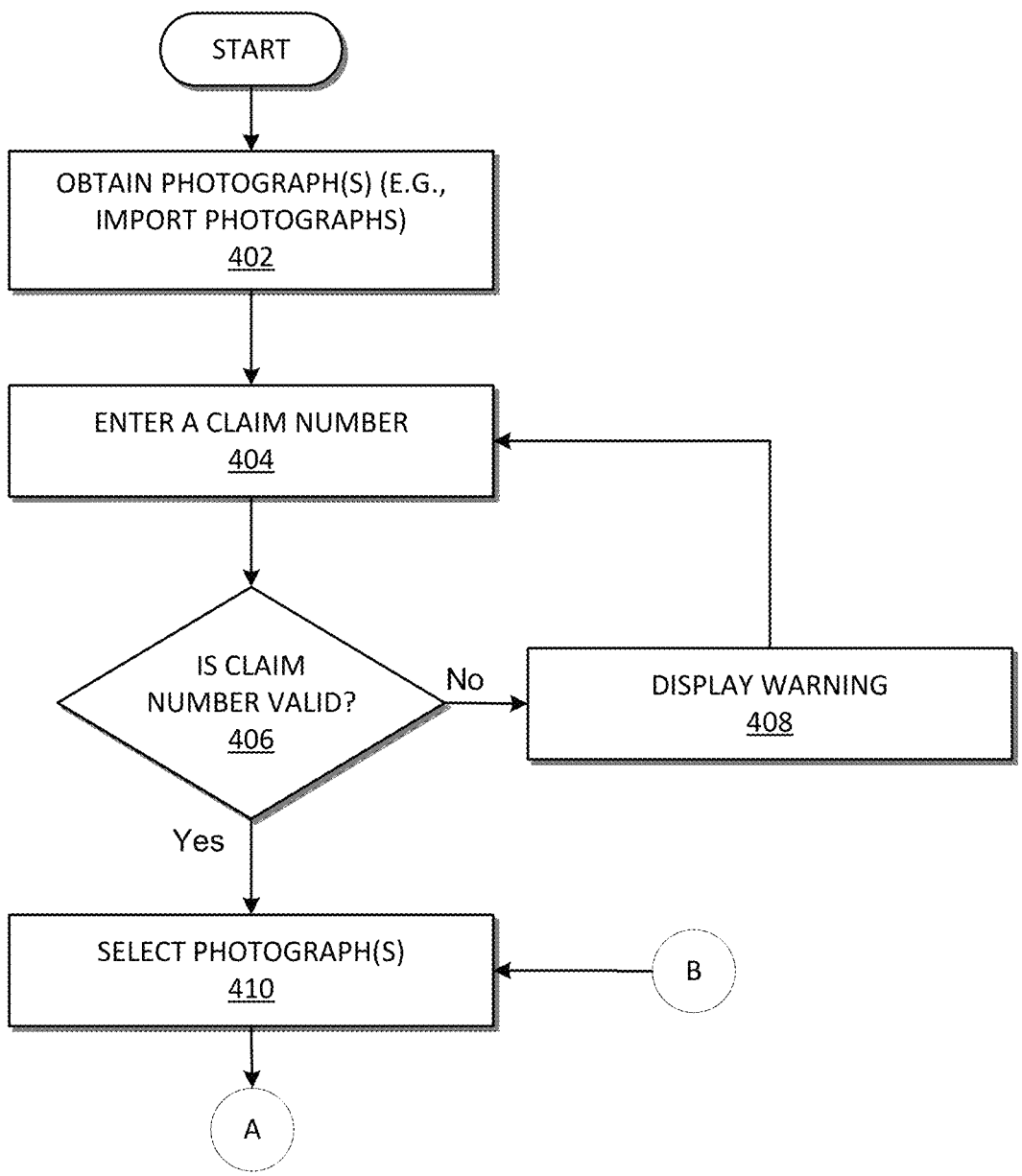
FIGS. 4A and 4B depict an illustrative method for formatting and labeling photographs taken by an insurance claims adjuster, according to one or more aspects of the disclosure.
Figure 4B:
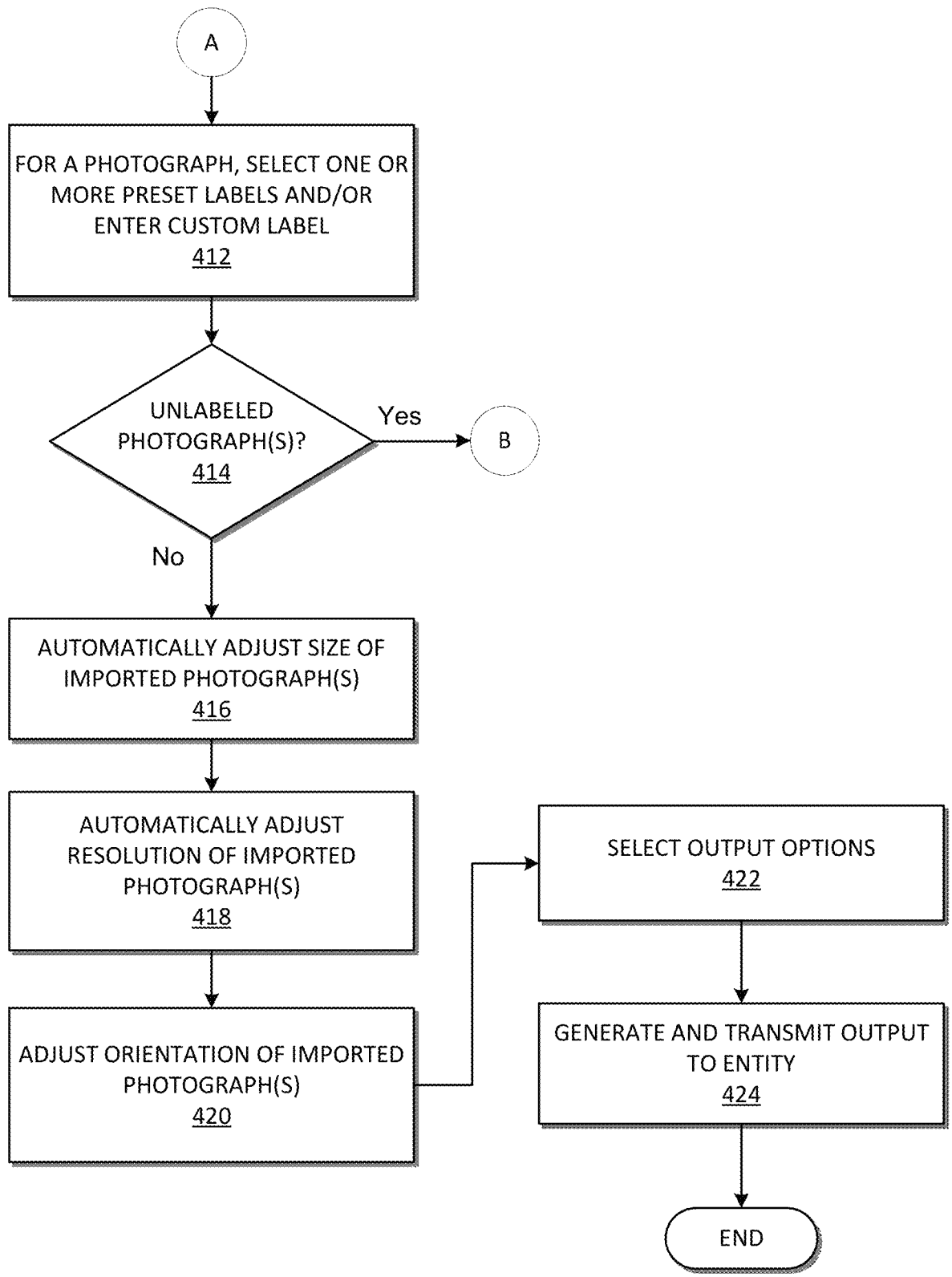

FIGS. 4A and 4B depict an illustrative method for formatting and labeling photographs taken by an insurance claims adjuster 202, according to one or more aspects of the disclosure. The method of FIGS. 4A and 4B and/or one or more steps thereof may be performed by a computing device (e.g., the adjuster's computing device 208). The method illustrated in FIGS. 4A and 4B and/or one or more steps thereof may be partially or fully embodied, for example, in computer-executable instructions that are stored in a computer-readable medium, such as a non-transitory computer-readable memory. In some instances, one or more steps of FIGS. 4A and 4B may be performed in a different order and/or combined. In some instances, one or more steps of FIGS. 4A and 4B may be omitted and/or otherwise not performed.

In at least some examples, prior to performing the steps of FIGS. 4A and 4B, the method of FIG. 3 may be performed. As a result, the adjuster's computing device 208 (e.g., personal computer, laptop, tablet, smartphone, etc.) may include a photograph labels claims tool 101 installed thereon for use by the insurance claims adjuster 202. As used herein with reference to FIGS. 4A and 4B, one or more functions described as being performed by the adjuster's computing device 208 may be described as being performed by the photo label claims tool 101 installed thereon.

As shown in FIG. 4A, the method may begin at step 402 in which the photograph label claims tool 101 may obtain photographs taken by the insurance claims adjuster 202. The photographs may be of one or more physical property items 206 (e.g., doors, roofs, siding, vehicles, and the like), which may have been damaged, for example, by an act of nature (e.g., a storm, a flood, an earthquake, etc.), an accident, or the like. In one instance, the photographs may have been taken on a standalone camera 204 and transferred to the adjuster's computing device 208 via one or more of a wireless transmission, a wired transmission, a removable storage device (e.g., a USB flash drive), or other transmission mechanisms. In another instance, the adjuster's computing device 208 may include camera 204, which may enable the adjuster's computing device 208 to take photographs. In either instance, once the photographs are stored on the adjuster's computing device 208, the insurance claims adjuster 202 may open the photograph label claims tool 101 and select one or more of the stored photographs to import into the photograph label claims tool 101.

At step 404, the photograph label claims tool 101 may prompt the insurance claims adjuster 202 to enter a claim number to assign to the imported photographs. At step 406, once the claim number is entered, the photograph label claims tool 101 may determine whether the entered claim number is valid. In some instances, the verification may be performed locally by the photograph label claims tool 101. In other instances, the verification may be performed remotely by the management server 135 or another computing device of the insurance provider. In such instances, the photograph label claims tool 101 may send the entered claim number to the insurance provider's computing device and, in response, receive an indication of whether the entered claim number is valid from the insurance provider's computing device.

The validation may be based on whether the entered claim number is compliant with one or more claim number conditions (e.g., rules). One condition may specify the number of characters in the claim number. As a result, a claim number with more than or less than the specified number of characters may be considered an invalid claim number. Another condition may specify that the claim number contain only numeric characters (e.g., it might not contain alphabetic character or symbol characters). As a result, a claim number with an alphabetic character and/or a symbol character may be an invalid claim number. Yet another condition may specify that the claim number only include alphanumeric characters. One or more conditions may be made of combinations of other conditions.

In some instances, rather than using the one or more claim number conditions, the adjuster's computing device 208 may receive and store a list of valid claim numbers with which the entered claim number may be compared. The adjuster's computing device 208 may periodically receive updates to the list of valid claim numbers from the management server 135. In yet other instances, rather than having the insurance claims adjuster 202 enter a valid claim number, the photograph label claims tool 101 may generate a valid claim number and assign the valid claim number to the imported photographs.

If a valid claim number is not entered, then, at step 408, the photograph label claims tool 101 may display a warning that the entered claim number is not valid. The warning may include one or more reasons that the entered claim number is not valid. As an example, the reasons may identify one or more of the claim number conditions that have been violated by the entered claim number. Additionally, the process may return to step 404 to permit the insurance claims adjuster to enter another claim number. In some instances, the process might not continue until a valid claim number is entered.

In some cases, the insurance claims adjuster 202 may wish to associate the imported photographs with a claim number that has been previously created. In such cases, the photograph label claims tool 101 may look up a claim number in a local or remote database based on search criteria (e.g., claim number, name, witness, accident type, etc.) entered by the insurance claims adjuster 202.

Figure 5:
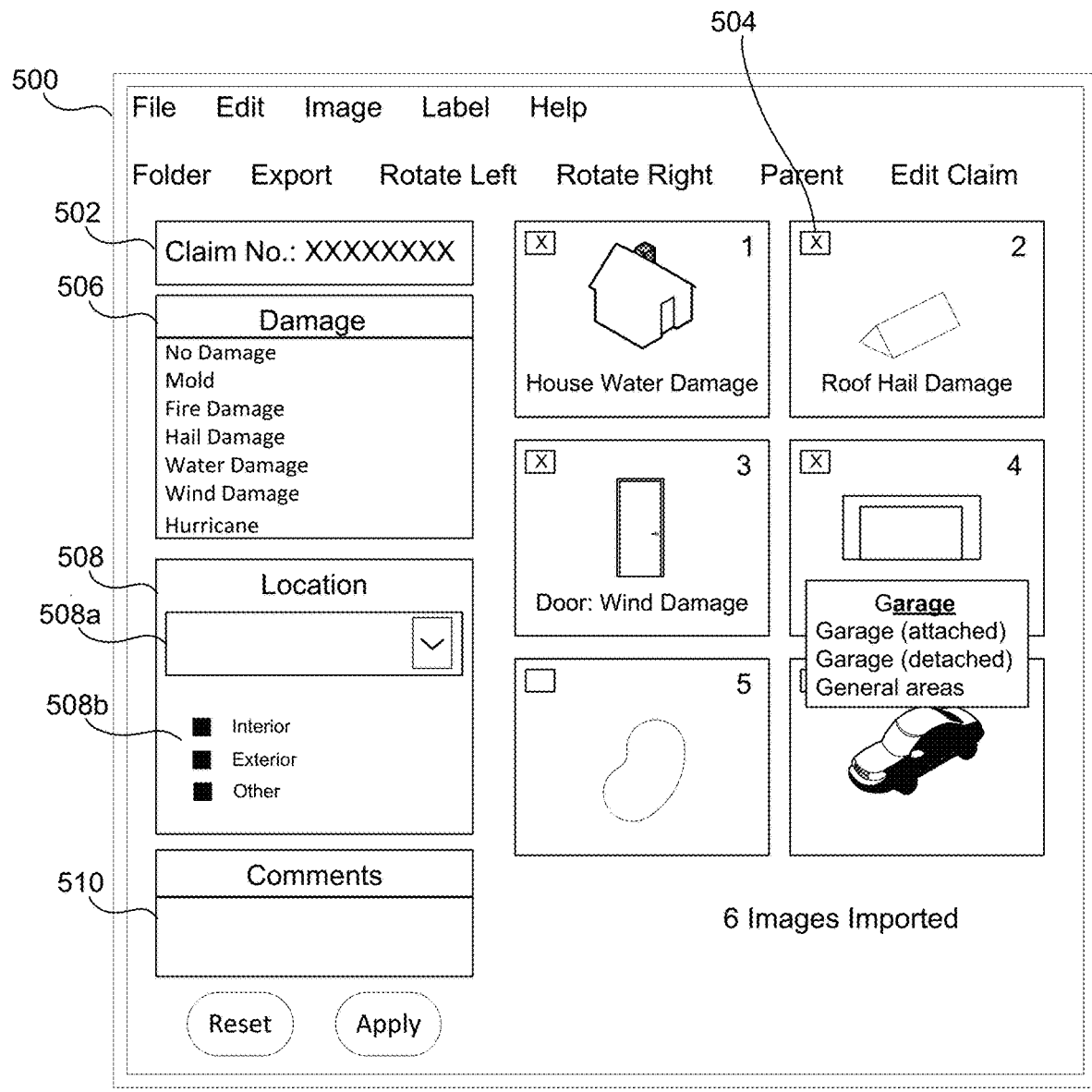
FIG. 5 depicts an illustrative user interface for labeling photographs, according to one or more aspects of the disclosure.

Once valid claim number is received, then, at step 410, the insurance claims adjuster 202 may use the photograph label claims tool 101 to select one or more of the imported photographs for labeling. FIG. 5 depicts an illustrative user interface 500 of the photograph label claims tool 101 for selecting and labeling photographs, according to one or more aspects of the disclosure. As shown in FIG. 5, the user interface 500 may include a field 502 for the insurance claims adjuster to enter the claim number as discussed above in step 404. Using the user interface 500, the insurance claims adjuster 202 may select a first set of photographs of the imported photographs that the insurance claims adjuster 202 wishes to label and possibly group together. The photograph label claims tool 101 may indicate which photographs have been selected. As an example, in user interface 500, a selection box 504 may be checked. In some cases, the photograph may be highlighted and/or unselected photographs may be grayed out (e.g., may become partially transparent).

Referring now to FIG. 4B, at step 412, the insurance claims adjuster 202 may, for the first set of selected photographs, select one or more preset labels and/or enter a custom label using the photograph label claims tool 101. For instance, the user interface 500 may provide various selectable preset labels 506 for selecting a type of property damage, with which to label the damaged item depicted in a specified photograph. As an example, there may be a label indicating no damage, mold damage, fire damage, hail damage, water damage, wind damage, hurricane damage, flood damage, earthquake damage, vandalism damage, and/or other types of physical damage. In some instances, the damage type may also specify the cause of the damage. For example, a label may indicate that the damage occurred as the result of a hurricane, earthquake, vandalism, or the like. In some cases the preset labels 506 for selecting types of property damage may be presented in a scrollable list. Additionally, each photograph may include a selectable field proximate to the photograph (e.g., underneath the photograph, overlapping the photograph, above the photograph, etc.) where the user may begin to enter text describing the type of property damage. As the user enters text, preset labels describing types of property damage that begins with those letters may be displayed in a pop-up dropdown list for selection.

In addition to providing preset selectable label describing types of property damage, the photograph label claims tool 101 may permit the user to enter customized labels for describing the type of property damage depicted in a photograph. In some cases, the preset label describing types of property damage might not adequately describe the type of property damage for an item depicted in the photograph. In such cases, the insurance claims adjuster 202 may select a field associated with the photograph, which may be the selectable field proximate to the photograph as discussed above. The insurance claims adjuster 202 may then enter a custom textual description of the type of property damage.

In addition to entering the customized label for the type of property damage, the insurance claims adjuster 202 may wish to use the customized label for other photographs. The photograph label claims tool 101 may permit the insurance claims adjuster 202 to store and/or otherwise add the custom label to the preset labels describing types of property damage. As a result, the insurance claims adjuster 202 may select the custom label from the preset list of labels of types of property damage when labeling other photographs. As an example, the insurance claims provider 202 may enter a custom label of "meteorite damage" and store the custom label as a preset label for labeling other photographs.

The photograph label claims tool 101 may include selectable options specifying different levels of persistence of the customized label in the preset list of labels of types of property damage. A first option may be to store and permit use of the custom label as a preset label of types of property damage for this session only. The insurance claims adjuster 202 may select the first option if the insurance claims adjuster 202 wishes to use custom label only for the current session. Under the first option, the photograph label claims tool 101 may use the custom label as a preset label until the photograph label claims tool 101 is closed or a different claim number is selected. Once closed or in response to a selection of a different claim number, the photograph label claims tool 101 may remove the custom label from the list of preset labels in order to avoid cluttering the list of preset labels.

A second option may be to store and permit use of the custom label as a preset label for only the current claim number. The insurance claims adjuster 202 may select the second option if the insurance claims adjuster 202 wishes to use the custom label as a preset label only for photographs associated with the current claim number and not for use in labeling photographs associated with other claim numbers. As a result, the custom label might not be displayed in the list of preset labels when labeling photographs associated with a different claim number. Under the second option, the photograph label claims tool 101 may store a map mapping each custom label to a corresponding claim number.

A third option may be to store and permit use of the custom label as a preset label for each (e.g., all) claim numbers. The insurance claims adjuster 202 may select the third option if the insurance claims adjuster 202 wishes to use the custom label for other sessions and other claim numbers. Under the third option, the photograph label claims tool 101 may store the custom label as a preset label for use with each photograph regardless of the claim number.

In addition to having preset labels to describe the type of property damage, the photograph label claims tool 101 may also include preset labels describing the type of property item depicted in a photograph. For example, one or more preset labels may include house, yard, roof, door, window, vehicle (e.g., motorcycle, car, truck, boat, RV, etc.), garage door, appliance (e.g., television, speakers, etc.), furniture (e.g., couch, chair, table, etc.), jewelry, and other valuable or insured property items. In addition, the photograph label claims tool 101 may include one or more preset labels describing the location of the property item (e.g., living room, dining room, master bedroom, guest bedroom, bathroom, front side, left side, right side, back side, driver seat, front passenger seat, back passenger seats, trunk, yard, and the like). In some cases, the label describing the property type may also describe its location (e.g., front door).

The user interface 500 may include preset labels 508 for describing the type of property item and/or its location. The user interface 500 may include a field 508a by which the user may enter a word describing the type of property item or its location, which may result in a drop down of options of preset labels 508 from which the insurance claims adjuster 202 may select. The user interface 500 may also include a hierarchically (e.g., tree-like) expandable list 508b by which the user can select various preset labels describing the property item or its location. As shown, the user interface 500 may include expandable nodes of the list including exterior, interior, and other. A selection of "exterior" results in the display of a listing of exterior property items of a structure (e.g., door, pool, roof, etc.). A selection of "interior" results in the display of a listing of interior property items of a structure (e.g., kitchen, bathroom, living room, etc.). A selection of "other" results in the display of other property items (e.g., car, jewelry, or other personal property). By having a hierarchically arranged tree, the insurance claims adjuster 202 can quickly navigate to the most appropriate preset label.

As with the preset labels describing types of property damage, the insurance claims adjuster 202 may create custom labels describing a property item and/or its location. For instance, in a field proximate to a photograph, which may be the same field as entering a custom type of property damage described above, the insurance claims adjuster 202 may enter a custom label describing the property item and/or its location. The photograph label claims tool 101 may provide the insurance claims adjuster 202 with various options specifying different levels of persistence in a similar manner as discussed above in connection with the custom label of types of property damage. For instance, a custom label describing the property item and/or its location may be set to be a part of the preset labels describing property items and/or their location for the current session only under a first option, for the claim number only under a second option, or for use with all claim numbers and sessions under a third option. As an example, if the insurance claims adjuster 202 works in a market or location where a particular property item is frequently damaged (e.g., pool pumps in Florida), the insurance claims adjuster 202 may create customized label identifying the property item for use with multiple claims.

As labels are selected for a photograph, the photograph label claims tool 101 may store the association of the selected label with the photograph and may display the selected label proximate to the photograph. The photograph may be modified to include the selected label in a predetermined region on the photograph. In some cases, the label may be displayed underneath the photograph, on top of the photograph, on a side of the photograph, or overlapping a particular portion of the photograph.

Further, the photograph label claims tool 101 may permit the insurance claims adjuster 202 to enter comments in a comments field 510 for each photograph. Since the custom labels may have maximum character limits, the insurance claims adjuster 202 may add descriptions or other information (e.g., witness accounts, etc.) in the comments field 510. The comments field 510 may have a greater character limit than a custom label. The comment may be specific to a photograph currently selected/activated in the user interface 500.

Returning to FIG. 4B, at step 414, the photograph label claims tool 101 may determine whether there are any unlabeled photographs in the imported photographs. If so, the process may return to step 410 so that one or more unlabeled photographs may be selected and labeled in step 412. Steps 410-414 may be repeated until either all of the imported photographs have been labeled or until the insurance claims adjuster 202 specifies (e.g., by selecting an icon) that the process may proceed to the next step.

Once one or more labels have been added to the imported photographs, the photograph label claims tool 101 may, at step 416, automatically adjust the size of the imported photographs. For instance, the size of the photographs may be reduced in order to reduce the file size of the imported photographs to facilitate wireless transfer of the imported photographs to the insurance provider (e.g., by reducing bandwidth used for the transfer). The reduced size of each photograph may be preset in the photograph label claims tool 101. In other instances, the insurance claims adjuster 202 may select the reduced size of the photographs. In yet other instances, the reduced sized may be selected by the photograph label claims tool 101 based on how many photographs have been imported for the claim number and/or are to be transferred to the insurance provider. If the number of photographs imported is less than a first threshold number of photographs, a first reduced size of each photograph may be selected. If the number of imported photographs exceeds the first threshold but not a second threshold number of photographs, a second (e.g., different) reduced size of each photograph may be selected. If the number of imported photographs exceeds the second threshold, a third reduced sized of each photograph may be selected. For example, the first threshold may be 50 photographs and the second threshold may be 100 photographs. If the number of imported photographs is fewer than 50, each of the imported photographs may be reduced to a first size. If the number of imported photographs is 50 or more but fewer than 100, each of the imported photographs may be reduced to a second size smaller than the first size. If the number of imported photographs is 100 or more, each of the imported photographs may be reduced to a third size smaller than the second size. As a result, the photograph label claims tool 101 may reduce photographs to a smaller size to accommodate greater numbers of imported photographs. While two thresholds are described above, more or less than the two thresholds may be used by the photograph label claims tool 101. In some cases, the photograph label claims tool 101 might not reduce the size of imported photographs based on the number of imported photographs.

In some cases, the photographs may be reduced by reducing the size of the photograph without removing/deleting any portions of the photograph (e.g., a thumbnail). In other cases, a photograph's size may be reduced by removing/deleting portions of a photograph. For instance, the photograph label claims tool 101 may include a selectable option to remove an outer perimeter portion of a photograph under the assumption that the damaged property item is centrally located in the photograph. The photograph label claims tool 101 may include a cropping tool to enable the user to identify portions of a photograph to remove/delete thereby reducing its size. The photograph label claims tool 101 may include a status indicator that notifies the insurance claims adjuster 202 when a photograph being cropped has been reduced to a maximum photograph size selected by the photograph label claims tool 101 (which may be based on the number of imported photographs as discussed above). In some cases, a photograph may be cropped and then reduced to a thumbnail size.

At step 418, the photograph label claims tool 101 may automatically adjust the resolution of the imported photographs in order to further reduce the file size of the imported photographs. In some cases, the photograph label claims tool 101 may be configured to reduce each imported photograph to a preset resolution. As an example, an imported photograph having a 16 megapixel resolution may be reduced to have a 4 megapixel resolution. In some cases, the reduced resolution may be selected by the photograph label claims tool 101 based on the number of imported photographs and/or the number of photographs to be transferred to the insurance provider. If the number of photographs imported is less than a first threshold number of photographs, a first resolution for each photograph may be selected. If the number of imported photographs exceed the first threshold but not a second threshold number of photographs, a second (e.g., different) resolution for each photograph may be selected. If the number of imported photographs exceeds the second threshold, a third resolution for each photograph may be selected. As a result, the photograph label claims tool 101 may reduce the resolution of the photographs to accommodate the greater numbers of imported photographs. While two thresholds are described above, more or less than two thresholds may be used by the photograph label claims tool 101. In some cases, the photograph label claims tool 101 might not reduce the resolution of the imported photographs based on the number of imported photographs. Instead, in some cases, the resolution of the photograph label claims tool 101 may be selected the insurance claims adjuster 202.

At step 420, the photograph label claims tool 101 may permit the insurance claims adjuster 202 to manually adjust an orientation of each of the imported photographs. In some instances, this step may be performed during labelling of the photographs in step 412. The photograph label claims tool 101 may include one or more reference photographs of property items in an upright orientation for view by the insurance claims adjuster 202. The property items may be any property item described herein including, for example, homes, apartments, rooms, vehicles, etc. The photograph label claims tool 101 may also include a mapping of the reference photographs with the preset labels describing the type of property item described above. As an example, a preset label for a vehicle may correspond to a reference photograph of a vehicle in an upright position. As another example, a preset label for a door may correspond to a reference photograph of a door in an upright position.

Once a preset label describing a property item depicted in an imported photograph has been selected, the photograph label claims tool 101 may use the selected preset label describing the property item to lookup a corresponding reference photograph of a similar property item in the upright position. If a custom label has been entered instead of a preset label, the insurance claims adjuster 202 may manually select the reference photograph. The insurance claims adjuster 202 may compare the imported photograph with the reference photograph to determine if the property item depicted in the imported photograph is in an upright position. If the property item depicted in the imported photograph is not in the upright position, the insurance claims adjuster 202 may use the photograph label claims tool 101 to rotate the imported photograph and perform another comparison with the reference photograph. The insurance claims adjuster 202 may rotate the photograph until the insurance claims adjuster 202 determines that the property item depicted in the selected photograph is in an upright position. In some instances, the insurance claims adjuster 202 may use the photograph label claims tool 101 to rotate one imported photograph at a time. In other instances, the insurance claims adjuster 202 may use the photograph label claims tool 101 to select multiple imported photographs and batch rotate the selected imported photographs. Alternatively, in some examples, the photograph label claims tool 101 itself may perform some of the functions described above as being performed by the insurance claims adjuster 202 so that the insurance claims adjuster 202 would not have to manually compare an imported photograph with a reference photograph. As an example, the photograph label claims tool 101 may, for each imported photograph, automatically select a reference photograph based on a selected preset label describing a property item depicted in the imported photograph, compare the imported photograph with the reference photograph to determine whether the property item depicted in the imported photograph is in an upright position. If not, the photograph label claims tool 101 may automatically rotate the imported photograph until the property item depicted in the imported photograph is in an upright position based on continued comparisons with the reference photograph.

At step 422, the photograph label claims tool 101 may permit the insurance claims adjuster 202 to select output options for sending the imported photographs to the insurance provider. FIG. 6 depicts options for exporting photographs, according to one or more aspects of the disclosure. For instance, the insurance claims adjuster 202 may select an export type (e.g., compressed images, PDF, etc.), which photographs to export (e.g., selected or imported photographs, all photographs associated with a user-specified claim number), and a batch mode. The photograph label claims tool 101 may export photographs in accordance with selected export options to the management server 135 or another computing device of the insurance provider. FIG. 7 depicts email preferences for sending an email of photographs to the insurance provider or another entity, according to one or more aspects of the disclosure. The email preferences may include preferences to automatically generate and/or send an email upon a selection to export photographs to PDF by the insurance claims adjuster 202. The email settings may permit the insurance claims adjuster 202 to specify recipient email addresses, a subject line of the email, and a message in the body of the email. The email may include, as an attachment, a PDF of the imported photographs selected for export.

At step 424, the photograph label claims tool 101 may generate and transmit output to an entity (e.g., the insurance provider). For instance, upon selection of an option to export the imported photographs, the photograph label claims tool 101 may consult the various options selected by the insurance claims adjuster 202 in step 422. If the insurance claims adjuster 202 selected to send the imported photographs as a PDF via an email, the photograph label claims tool 101 may generate a PDF. FIG. 8 depicts an illustrative output document of formatted and labeled photographs, according to one or more aspects of the disclosure. The document may be in the form of a PDF and include the claim number entered and validated in steps 404 and 406. In addition, the document may include a copy of each of the imported photographs (or a subset of the imported photographs), which may have been reduced in size and resolution to minimize the size of the document. Each of the photographs may include any preset or custom labels selected by the insurance claims adjuster 202 for that photograph. The labels may overlay the photograph or be displayed immediately next to the photograph. Each of the photographs may also include the claim number associated with the photograph. In one or more arrangements, the document may include one or more watermarks to discourage fraudulent use of the photographs. In some cases, the photograph label claims tool 101 may provide a preview of the document for approval by the insurance claims adjuster 202.

In one or more arrangements, during the export to PDF function, the photograph label claims tool 101 may determine the total number of imported photographs for transmission. The photograph label claims tool 101 may be configured to permit only a maximum number of imported photographs per PDF document before generating another PDF document with a remainder of the imported photographs (up to the same maximum number of imported photographs per PDF document). As an example, the total number of imported photographs may be 110 photographs and the maximum number of imported photographs that may be included in a single PDF document may be 20 photographs. In such an example, the photograph label claims tool 101 may generate 6 PDF documents with the first 5 PDFs documents each including 20 imported photographs and the sixth PDF document including the remaining 10 imported photographs. The 6 PDFs may then be attached to the email generated by the photograph label claims tool 101.

Once approved, the photograph label claims tool 101 may transmit (e.g., email) the output (e.g., PDF documents) to the management server 135 and/or another computing of the insurance provider for use in processing the claim. The management server 135 may identify the claim number associated with the document and store the document in a database of documents such that the document may be retrieved using its claim number.

While the aspects described herein have referred to "photographs," any images having various file types may be used with the system. Using various aspects described herein, an insurance claims adjuster 202 may quickly and efficiently associate photographs with an insurance claim, format and label the photographs, and transfer the formatted and labeled photographs to an insurance provider.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:
1. An apparatus comprising:
a processor; and
a memory storing computer-readable instructions that, when executed by the processor, cause the apparatus to:
associate a plurality of photographs with a claim number for an insurance claim;

display a user interface comprising the plurality of photographs, a plurality of selectable fields, a first set of preset labels describing a plurality of property items, and a second set of preset labels describing a plurality of types of damage;

receive, via a first selectable field of the plurality of selectable fields, a first label describing a property item depicted in a first photograph of the plurality of photographs;

responsive to determining that the first label is a custom label, save the first label as a selectable preset label within the first set of preset labels;

receive a second label, via a second selectable field of the plurality of selectable fields or via the second set of preset labels, the second label describing a type of damage associated with the property item depicted in the first photograph;

determine a reduced size and a reduced resolution for the plurality of photographs based on a number of photographs to be transmitted to an insurance provider;

automatically reduce a resolution and a size of the plurality of photographs to the reduced size and the reduced resolution;

generate a document comprising the claim number, the plurality of photographs having the reduced size and the reduced resolution, the first label describing the property item depicted in the first photograph, and the second label describing the type of damage associated with the property item depicted in the first photograph; and transmit the document to the insurance provider.

2. The apparatus of claim 1, wherein the memory stores computer-readable instructions that, when executed by the processor, cause the apparatus to:

receive a selection of a preset label describing a location of the property item depicted in the first photograph of a plurality of preset labels describing a plurality of locations of property items, wherein the document comprises the selection describing the location of the property item depicted in the first photograph.

3. The apparatus of claim 1, wherein the memory stores computer-readable instructions that, when executed by the processor, cause the apparatus to:

identify a reference photograph corresponding to the first label, wherein the first label describes the property item depicted in the first photograph;

determine that the property item depicted in the first photograph is not in an upright position by comparing the first photograph with the reference photograph; and responsive to the determining, rotate the first photograph such that the property item depicted in the first photograph is in an upright position.

4. The apparatus of claim 1, wherein the memory stores computer-readable instructions that, when executed by the processor, cause the apparatus to:

determine a size of the first photograph;

in response to determining that the size of the first photograph is larger than a predetermined size, provide a cropping tool to enable a user to remove one or more portions of the first photograph; and notify the user when the first photograph has been reduced to at least the predetermined size.

5. The apparatus of claim 1, wherein the memory stores computer-readable instructions that, when executed by the processor, cause the apparatus to:

determine a size of the first photograph;

in response to determining that the size of the first photograph is larger than a predetermined size, provide a selectable option to enable a user to remove one or more outer perimeter portions of the first photograph; and notify the user when the first photograph has been reduced to at least the predetermined size.

6. A method comprising:

receiving, by a computing device, a plurality of photographs;

associating, by the computing device, the plurality of photographs with a claim number for an insurance claim;

displaying, by the computing device, a user interface comprising the plurality of photographs, a first set of preset labels describing a plurality of property items, and a second set of preset labels describing a plurality of types of damage;

receiving, by the computing device, a first selected preset label, of the first set of preset labels describing the plurality of property items, the first selected preset label describing a property item depicting in a first photograph of the plurality of photographs;

receiving a second selected preset label, of the second set of preset labels describing the plurality of types of damage, the second selected preset label describing a type of damage associated with the property item depicted in the first photograph;

determining, by the computing device, a reduced size and a reduced resolution for the plurality of photographs based on a number of photographs to be transmitted to an insurance provider;

automatically reducing, by the computing device, a resolution and a size of plurality of photographs to the reduced size and the reduced resolution;

generating, by the computing device, a document comprising the claim number, the plurality of photographs having the reduced size and the reduced resolution, the first selected preset label, and the second selected preset label; and transmitting, by the computing device, the document to the insurance provider.

7. The method of claim 6, further comprising:

receiving, by the computing device, a first custom label describing a property item depicted in a second photograph;

receiving, by the computing device, a second custom label describing the type of damage associated with the property item depicted in the second photograph; and saving the first custom label and the second custom label as selectable preset labels.

8. The method of claim 6, further comprising:

receiving a selection of a preset label describing a location of the property item depicted in the first photograph of a plurality of preset labels describing a plurality of locations of property items.

9. The method of claim 6, further comprising:

identifying a reference photograph corresponding to the first selected preset label, wherein the first selected preset label describes the property item depicted in the first photograph;

determining that the property item depicted in the first photograph is not in an upright position by comparing the first photograph with the reference photograph; and responsive to the determining, rotating the first photograph such that the property item depicted in the first photograph is in an upright position.

10. The method of claim 6, further comprising:
determining a size of the first photograph;
in response to determining that the size of the first photograph is larger than a predetermined size, providing a cropping tool to enable a user to remove one or more portions of the first photograph; and
notifying the user when the first photograph has been reduced to at least the predetermined size.

11. The method of claim 6, further comprising:
determining a size of the first photograph;
in response to determining that the size of the first photograph is larger than a predetermined size, providing a selectable option to enable a user to remove one or more outer perimeter portions of the first photograph; and
notifying the user when the first photograph has been reduced to at least the predetermined size.

12. A system comprising:
a computing device of an insurance claims adjuster, the computing device comprising:
a processor; and
a memory unit storing computer-readable instructions that, when executed by the processor, cause the system to:
associate a plurality of photographs with a claim number for an insurance claim;
display a user interface comprising the plurality of photographs, a first set of preset labels describing a plurality of property items, and a second set of preset labels describing a plurality of types of damage;
receive a first selected preset label, of the first set of preset labels describing the plurality of property items, the first selected preset label describing a property item depicted in a first photograph of the plurality of photographs;
receive a second selected preset label, of the second set of preset labels describing the plurality of types of damage, the second selected preset label describing a type of damage associated with the property item depicted in the first photograph;
determine a reduced size and a reduced resolution for the plurality of photographs based on a number of photographs to be transmitted to an insurance provider;
automatically reduce a resolution and a size of the plurality of photographs to the reduced size and the reduced resolution;
generate a document comprising the claim number, the plurality of photographs having the reduced size and the reduced resolution, the first selected preset label describing the property item depicted in the first photograph, and the second selected preset label describing the type of damage associated with the property item depicted in the first photograph; and
transmit the document to the insurance provider.

13. The system of claim 12, wherein the memory unit stores computer-readable instructions that, when executed by the processor, further cause the system to:
identify a reference photograph corresponding to the first selected preset label, wherein the first selected preset label describes the property item depicted in the first photograph;
determine that the property item depicted in the first photograph is not in an upright position by comparing the first photograph with the reference photograph; and
responsive to the determining, rotate the first photograph such that the property item depicted in the first photograph is in an upright position.

14. The system of claim 12, wherein the memory unit stores computer-readable instructions that, when executed by the processor, further cause the system to:
receive a first custom label describing a property item depicted in a second photograph;
receive a second custom label describing a type of damage associated with the property item depicted in the second photograph; and
save the first custom label and the second custom label as selectable preset labels.

15. The system of claim 12, wherein the memory unit stores computer-readable instructions that, when executed by the processor, further cause the system to:
determine a size of the first photograph;
in response to determining that the size of the first photograph is larger than a predetermined size, provide a cropping tool to enable a user to remove one or more portions of the first photograph; and
notify the user when the first photograph has been reduced to at least the predetermined size.

16. The system of claim 12, wherein the memory unit stores computer-readable instructions that, when executed by the processor, further cause the system to:
receive a selection of a preset label describing a location of the property item depicted in the first photograph of a plurality of preset labels describing a plurality of locations of property items, wherein the document comprises the selection of the preset label describing the location of the property item depicted in the first photograph.

17. The system of claim 12, wherein the memory unit stores computer-readable instructions that, when executed by the processor, further cause the system to:
determine a size of the first photograph;
in response to determining that the size of the first photograph is larger than a predetermined size, provide a selectable option to enable a user to remove one or more outer perimeter portions of the first photograph; and
notify the user when the first photograph has been reduced to at least the predetermined size.

* * * * *